United States Patent [19]

McNamara et al.

[11] Patent Number: 5,408,507

[45] Date of Patent: Apr. 18, 1995

[54] EXTENDED RANGE ENHANCED SKEW CONTROLLER

[75] Inventors: Robert P. McNamara, San Jose; Amar C. Amar, Fremont; Prabhakara C. Balla, San Jose; Hung C. Pon, Sunnyvale; Chuan-Lung Chao, San Jose; Chongzhen Wang, San Francisco, all of Calif.

[73] Assignee: First Pacific Networks, Inc., Sunnyvale, Calif.

[21] Appl. No.: 53,994

[22] Filed: Apr. 27, 1993

[51] Int. Cl.⁶ .................... H04L 7/00; H04L 25/36; H04L 25/40

[52] U.S. Cl. ........................... 375/371; 375/358; 371/1; 371/33

[58] Field of Search ............... 375/106, 107, 109, 118; 370/13, 85.1, 85.5, 85.15, 94.1, 104.1, 108; 371/1, 20.5, 32, 33, 34; 455/13.2, 18

[56] References Cited

U.S. PATENT DOCUMENTS

| | | | |
|---|---|---|---|
| 4,411,007 | 10/1983 | Rodman et al. | 375/109 |
| 4,926,446 | 5/1990 | Gover et al. | 370/104.1 |
| 5,095,444 | 3/1992 | Motles | 370/13 |

*Primary Examiner*—Stephen Chin
*Assistant Examiner*—Don N. Vo
*Attorney, Agent, or Firm*—Townsend and Townsend Khourie and Crew; Kenneth R. Allen; Stephen J. LeBlanc

[57] ABSTRACT

An apparatus and method for extending the range of a digital data network by enhancing skew control. The apparatus is a circuit for use in a network interface unit. The apparatus measures the distance of the network interface unit from the head-end retransmission unit of the network by transmitting a series of signal packets on the network and counting the time it takes for the packets to be received back at the interface unit. All transmissions on the network take place with reference to a timing mark transmitted by the head-end unit at a regular interval. The apparatus sends the first in the series of signal packets at a pre-determined pre-skew interval before the timing mark. The apparatus counts the number of clock cycles after the timing mark before the signal packet is received back at the network interface unit. If the signal packet is not received back at the network unit within a pre-determined number of clock cycles, the apparatus sends a new signal packet at a new, larger pre-skew interval before the timing mark and again counts the clock cycles after the timing mark. This process is repeated until a signal packet is successfully received back at the network interface unit. Once a signal packet is successfully received back at the network interface unit, the pre-skew value at which the packet was sent and the value of the number of clock cycles after the timing mark at which the packet was received back is stored in the interface unit and all subsequent transmissions by that unit on the network are done at an interval before the timing mark defined by the stored skew value.

4 Claims, 3 Drawing Sheets

EXTENDED RANGE ENHANCED SKEW CONTROLLER

BACKGROUND OF THE INVENTION

The present invention relates generally to data communications networks and more specifically to an enhancement to network interface units in a high speed data interface network.

Modern data networks allow for the high speed transmission of digital data between multiple users. Such data might be digitized voice data in a private branch exchange (PBX) office telephone network, video data, or information data from digital information processing systems such as personal computers. Modern networks may allow for the transmissions of all three types of data over the same physical network cable.

One configuration for such a network is described in PCTUS89/01806 application. This network is illustrated in FIG. 1. It is characterized by a single network medium 12 connected to a plurality of network nodes, represented by Network Interface Units (NIUs) 20 each connected to a phone, computer, or other video, data, or voice processing device (P) 22. The single medium is such that it can simultaneously carry a number of different signals, each in a different frequency band, thus allowing the network to have a number of frequency division multiplexed channels for carrying data. Each channel is further divided into two different frequency bands: a transmit frequency band and a receive frequency band. NIUs on the network transmit data on the transmit frequency and receive it on the receive frequency. A single head-end retransmission unit (HRU) 50 receives all data transmitted on the transmit frequency and retransmits it on the receive frequency for reception by all network nodes.

FIG. 2 is a diagram showing the time structure of signals on this network. Circuitry associated with the HRU provides a series of timing mark packets (TMs), transmitted simultaneously on all channels, at 1-ms intervals, thereby defining a series of 1-ms frames.

In one configuration of the network for which the present invention is designed, each frame consists of a 10-byte TM, a 71-byte (60 data bytes) signalling packet (SP), and 28 19.5-byte (16 data bytes) voice/data timeslots (VTSs), each capable of containing a voice/data packet (VP).

VPs are used to provide voice communication containing binary encoded (pulse code modulation—PCM) speech from a specific phone conversation or to provide data communication. They are transmitted every cycle during the course of a conversation. When transmitting voice, VPs contain no computer recognizable information. They are merely reconstructed into voice at the receiving node.

SPs are used for communications between nodes and contain computer recognizable information pertinent to the control of the network. Among the functions of the SPs is the determination of skew intervals.

Each node is characterized by a skew time related to its physical position on the bus. Skew time refers to the different propagation delays resulting from the fact that the different nodes are at different distances from HRU 50. The nodes most remote from the HRU will receive the timing marks latest in time, and would, if they merely synchronized their transmissions to the timing mark, transmit relatively late compared to nodes nearer the HRU.

As a result of this skew time, there is a limit to the geographic range of the network. A typical maximum range in the prior art is about 5 km.

SUMMARY OF THE INVENTION

According to the invention, apparatus and method are provided for correcting for the different propagation delays in a bidirectional digital data network, thereby allowing a network of the type described to operate at a range of up to 80 km. The present invention is directed to a method and means whereupon each node determines its own skew time relative to other nodes. Each node, on power-up, transmits a series of signalling packets (SPs) upon receiving a timing mark and counts the number of clock cycles up to the width of the SP time period (1/(5.018 MHz)) until it receives the same SP (as retransmitted by the HRU). The first SP is transmitted at a pre-set pre-skew interval before the timing mark. If the SP is not received within the SP time period, the node increases the pre-skew interval and transmits a new SP. Once an SP is correctly received back at the node, the timing delay between transmission and reception is retained. This defines twice that node's skew time, and subsequent transmissions will be advanced by the skew time.

The invention will be understood upon reference to the following detailed description in connection with the accompanying drawings.

DESCRIPTION OF SPECIFIC EMBODIMENTS

Figure 3:
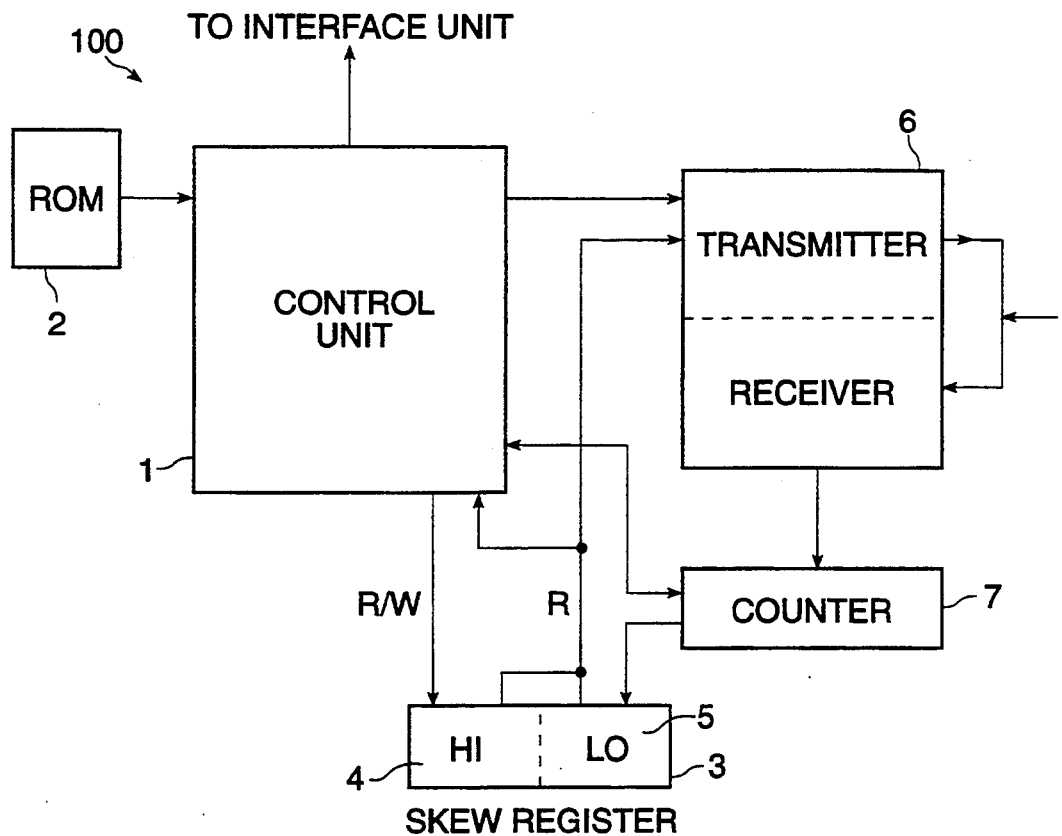
FIG. 3 is a schematic block diagram of an enhanced skew controller according to the invention.

FIG. 3 is a block diagram schematically showing the construction of an Extended Range Skew Controller 100 of the present invention. In the FIGURE, numeral 1 designates a control unit which handles communication with the other circuitry of the NIU and generates control signals to each of the other components of the Extended Range Skew Controller. Operation of the control unit may be governed by firmware which is stored in a Read Only Memory (ROM) 2 or it may be a state machine as a matter of design choice. Skew register 3 is a 12-bit register divided into a low-order 8-bit segment 5 and a high-order 4-bit segment 4. The control unit 1 can read data from both segments 4 and 5 of the register. The control unit 1 can also write data into high-order segment 4, but it cannot write into low-order segment 5 of the register. Counter 7 is an 8-bit counter which can count in a range of 0 to 255. Transmitter/receiver circuit 6 is for transmitting and receiving data packets over the network.

Figure 4:
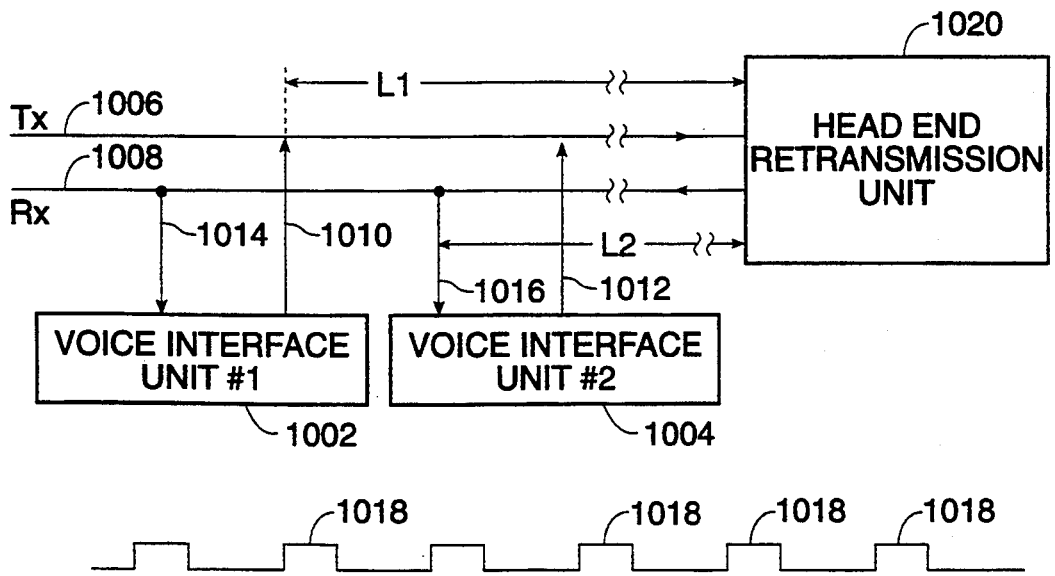
FIG. 4 is a schematic diagram illustrating the transmission time differences to the head-end retransmission unit.

FIG. 4 shows a pair of NIUs 1002 and 1004. The upstream frequency band on the broadband cable is shown schematically as a transmission line 1006, with the downstream frequency band being shown as a receiving line 1008. It should be understood however that this is a schematic representation only. In the network being described both upstream and downstream transmissions take place over a single coaxial cable with the upstream portion of the signal being carried on a carrier frequency different from the downstream portion. Each of NIUs 1002 and 1004 transmits in the upstream band (line 1006) as shown by arrows 1010, 1012. Similarly, each of NIUs 1002 and 1004 receives signals in a downstream frequency band (line 1008) as shown by arrows 1014, 1016. A series of timing marks 1018 which appear in the downstream frequency band are shown beneath line 1008 in FIG. 4.

As can be seen, NIU 1002 is a distance L1 from HRU 1020, while NIU 1004 is a distance L2 from HRU 1020. If NIU 1002 attempted to transmit in a timeslot defined to begin N microseconds after a timing mark 1018 by actually starting the transmission N microseconds after the timing mark is detected, the transmission would actually be received by NIU 1002 at a time t(skew) later. Time t(skew) is $(2*L_1/C)+t_0$, where $L_1$ is the distance to HRU 1020, C is the speed of the signal on the transmission medium and $t_0$ is any delay incurred through the HRU. A transmission from NIU 1004, on the other hand, will be delayed by $(2*L2/C)+t_0$. Accordingly, data transmitted by NIU 1002 will actually fall farther behind timing mark 1018 than data transmitted by NIU 1004.

According to the present invention, each NIU, upon booting up, will determine its particular skew time by transmitting a series of skew signal packets (SSPs) and calculating the amount of time before it correctly receives back an SSP. This time then is designated as a skew time, and each data packet transmitted thereafter will be transmitted an amount of time equal to the skew time earlier than the time that the specified timeslot will be detected on receiving line 1008 at that particular NIU. For example, if a NIU determines a skew time of 38 microseconds, this represents a network of approximately 3 miles in radius (assuming a delay of 6.25 microseconds per mile for an electromagnetic wave in the coaxial medium).

Figure 5:
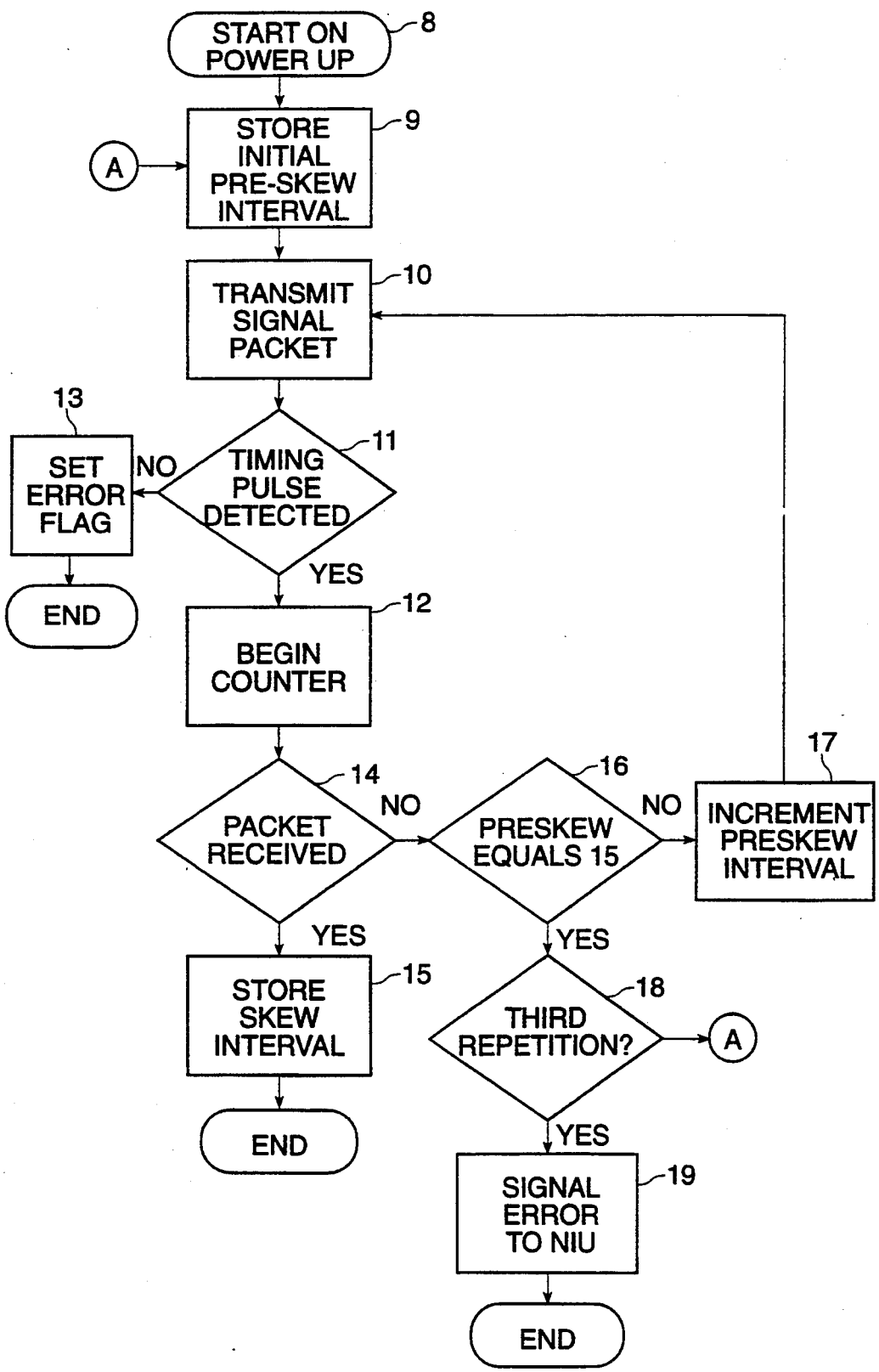
FIG. 5 is a flow chart showing the determination of skew time.

FIG. 5 is a flowchart illustrating the operation of the Extended Range Skew Controller. When a NIU begins operation on the network, either after a reset or on power-up (8), the control unit initiates skew determination by storing an initial pre-skew interval (9) in high-order part 4 of Skew Register 3. The control unit reads this initial pre-skew interval from the NIU. The initial pre-skew interval may be set by the user through software controlling the NIU based on the user's estimation of the distance of network node from the head-unit of the network. If no such estimation has been entered by the user, the initial pre-skew interval that the control unit stores in the high-order byte is 0. In an alternative embodiment, no provision is made for the user to set an initial pre-skew interval and the control unit sets an pre-skew interval based on a value stored in ROM 2.

Transmitting an SSP (10) occurs as follows: After storing the pre-skew interval, the control unit causes transmitter/receiver 6 to transmit an SSP and signals counter 7 to begin counting when the next timing mark is detected. The transmitter/receiver uses the pre-skew value stored in skew register 3 to determine when to send the SSP. The SSP is sent at a time interval before the next timing mark. The resultant time interval, as measured, is the pre-skew value stored in the skew register.

Once the SSP is transmitted, the transmitter/receiver waits for detection of a timing pulse on the reception frequency of the network. When a timing pulse is detected (11) counter 7 begins counting (12). If a timing pulse is not detected, an error flag is set (13) which can be read by the NIU.

Figure 1:
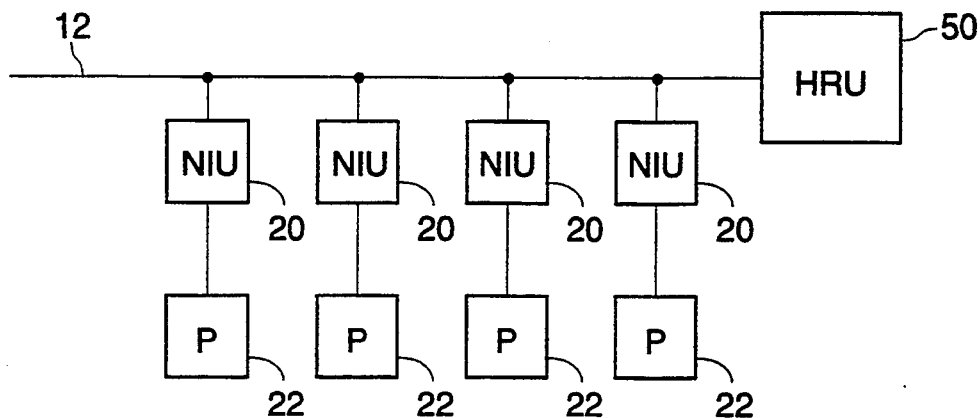
FIG. 1 is a block diagram of a prior art digital data network of the type for which the invention is intended.
Figure 2:
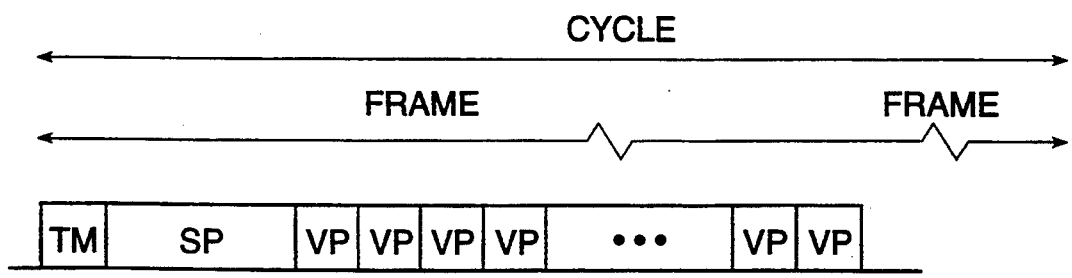
FIG. 2 is a diagram showing the time structure of signals on the network.

Counter 7 continues counting for the duration of the SP interval indicated in FIG. 2 or until the packet is received back at the transmitter/receiver after being retransmitted by the HRU (14). If the packet is received at the transmitter/receiver during the signal timing slot, the counter stops counting and stores its value in low-order part 5 of skew register 3 (15). The resultant value in skew register 3 is the sum of the pre-skew interval stored in the high-order part 4 and the counter value stored in low-order part 5.

If the packet is not received before the end of the signal timing slot, counter 7 stops counting, resets itself (to zero), and signals the control unit that the signal packet was not received. The control unit then reads the pre-skew interval stored in high-order segment 4 to determine if the value is 15, which is the largest possible value that the 4-bit segment can hold (16). If the value in part 4 is less than 15, the control unit increments the value in segment 4 by 1 (17), and then signals the transmitter/receiver to transmit a signal packet with the new pre-skew interval (10). If the value is 15, then the controller waits a pseudorandom amount of time between 20 and 40 seconds and the entire operation is repeated, up to a total of 3 times. At the end of the third repetition, if no SSP has been correctly returned, the controller halts skew determination, removes the node from the network and an error is reported to the NIU (19).

All publications and other references or patent documents cited herein are incorporated by reference. It is to be understood that the above description is intended to be illustrative and not restrictive. Many embodiments will be apparent to those skilled in the art upon reviewing the above description. The scope of the invention, therefore, should be determined with reference to the appended claims, along with the full scope of equivalents to which such claims are entitled.

What is claimed is:

1. A method for determining the skew interval in a long range digital network comprising the steps of:
    a) transmitting a signalling packet at a pre-skew interval prior to a timing clock; thereafter
    b) counting a number of clock cycles after the timing clock until a return signalling packet is returned;
    c) upon said return signalling packet not being returned within a predefined time period, increasing the pre-skew interval and then repeating steps a) and b) until said return signalling packet is returned during the predefined time period; and
    d) upon said return signalling packet being returned during the predefined time period, storing a resultant sum of said counted value and said pre-skew interval as the skew interval.

2. An apparatus in a network interface unit for determining the skew interval in a long range digital network comprising:
    means for storing a pre-skew interval based on geographical distance of said network interface unit from a headend unit of said digital network;
    means coupled to said storing means for transmitting a signalling packet at said pre-skew interval prior to a timing clock signal;

receiving means for receiving a return signalling packet;

counting means coupled to said receiving means for counting clock cycles following the timing clock signal until the return signalling packet is returned;

controller means coupled to said counting means and said storing means for detecting whether said counting means has detected a return signalling packet prior to elapse of a preset time period and, upon elapse of said preset time period when no return signalling packet has been detected by said counting means, for iteratively increasing the pre-skew interval and directing said transmitting means to retransmit the signalling packet until the counting means detects a return signalling packet within said preset time period; and storage means for storing the counter value as a skew interval indicative of the time a packet is returned during said preset time period.

3. The apparatus according to claim 2 where said pre-skew interval is set by a user.

4. A circuit in a network interface unit for determining the skew interval in a long range digital network employing a central clock and central timing pulse signal comprising:

a skew register having a low-order part and a high-order part for storing said skew interval;

a network transmitter means coupled to said skew register for transmitting signal packets and data packets at a transmit time which is stored in said skew register, said transmit time being prior to said timing pulse;

a network receiver for receiving packets;

a counter coupled to said network receiver and said skew register for counting a number of clock cycles which elapse between occurrence of timing pulse detection and receipt of a return signalling packet by the network receiver and for storing said number of clock cycles in said low-order part of said skew register; and a controller coupled to said high-order part of said skew register, said transmitter and said counter for detecting when said counter has failed to detect a return signalling packet within a predetermined time from said timing pulse, for increasing an interval stored in said high-order part of said skew register, for directing said transmitter to retransmit said signal packet at an increased pre-skew interval, and for halting retransmission of said signalling packet upon the receipt of a return signalling packet at said network receiver within a time period indicated by said high-order part of said skew register so that the high-order part and low-order part of said skew-register hold said skew interval.

* * * * *